(12) United States Patent
Haeuslmann

(10) Patent No.: US 9,249,005 B2
(45) Date of Patent: Feb. 2, 2016

(54) FILLING DEVICE FOR FILLING CONTAINERS

(75) Inventor: Mathias Haeuslmann, Amberg (DE)

(73) Assignee: KRONES AG, Neutraubling (DE)

( * ) Notice: Subject to any disclaimer, the term of this patent is extended or adjusted under 35 U.S.C. 154(b) by 360 days.

(21) Appl. No.: 13/185,571

(22) Filed: Jul. 19, 2011

(65) Prior Publication Data

US 2012/0012224 A1    Jan. 19, 2012

(30) Foreign Application Priority Data

Jul. 19, 2010   (DE) .......................... 10 2010 031 524

(51) Int. Cl.
| | |
|---|---|
| B65B 1/30 | (2006.01) |
| B67C 3/20 | (2006.01) |
| G01G 3/13 | (2006.01) |
| G01G 13/02 | (2006.01) |
| G01G 17/04 | (2006.01) |
| G01L 9/08 | (2006.01) |

(52) U.S. Cl.
CPC   B67C 3/202 (2013.01); G01G 3/13 (2013.01); G01G 13/02 (2013.01); G01G 17/04 (2013.01); G01L 9/08 (2013.01)

(58) Field of Classification Search
CPC .............. G01G 3/13; G01L 1/16; G01L 9/06; G01L 9/065; G01L 9/08; G01L 9/085; B67C 3/202
USPC ........................................................... 141/83
See application file for complete search history.

(56) References Cited

U.S. PATENT DOCUMENTS

| | | | | |
|---|---|---|---|---|
| 3,737,684 A | * | 6/1973 | Kuno et al. ................... | 327/538 |
| 4,697,657 A | * | 10/1987 | Portman et al. ......... | 177/210 FP |
| 5,442,964 A | * | 8/1995 | Coates et al. .............. | 73/862.68 |
| 5,778,764 A | * | 7/1998 | Nielsen .......................... | 99/285 |
| 6,073,667 A | | 6/2000 | Graffin | |
| 6,092,726 A | * | 7/2000 | Toussant et al. .............. | 235/383 |
| 6,667,444 B1 | * | 12/2003 | Armitage ...................... | 177/168 |
| 6,854,493 B2 | | 2/2005 | Ichikawa et al. | |
| 7,082,834 B2 | * | 8/2006 | Petrova et al. .................. | 73/708 |
| 7,980,277 B2 | * | 7/2011 | Amano .......................... | 141/83 |
| 2003/0102169 A1 | | 6/2003 | Balboni et al. | |
| 2003/0155035 A1 | | 8/2003 | Ichikawa et al. | |
| 2006/0151486 A1 | * | 7/2006 | Jung ............................ | 219/708 |
| 2010/0000628 A1 | | 1/2010 | Neumayer | |
| 2010/0132832 A1 | | 6/2010 | Neumayer | |

(Continued)

FOREIGN PATENT DOCUMENTS

| | | |
|---|---|---|
| CH | 386 913 A | 1/1965 |
| DE | 102004021832 A1 | 12/2005 |

(Continued)

OTHER PUBLICATIONS

European Patent Office, European Search Report in European Patent Application No. 11 16 8165 (Oct. 26, 2011).

(Continued)

Primary Examiner — Jason K Niesz
(74) Attorney, Agent, or Firm — Leydig, Voit & Mayer, Ltd.

(57) ABSTRACT

A filling device for filling containers with a food product is provided for use in the food industry. The filling device comprises at least one weighing device including at least one piezoelement configured to determine a filling amount of the food product.

15 Claims, 5 Drawing Sheets

(56) References Cited

U.S. PATENT DOCUMENTS

| | | |
|---|---|---|
| 2010/0175784 A1 | 7/2010 | Zanini |
| 2011/0103175 A1 | 5/2011 | Waldmann et al. |

FOREIGN PATENT DOCUMENTS

| | | |
|---|---|---|
| DE | 60308237 T2 | 9/2007 |
| DE | 102007019186 A1 | 10/2008 |
| DE | 102008025268 A1 | 12/2009 |
| DE | 102008030721 A1 | 1/2010 |
| EP | 0373396 A1 | 6/1990 |
| EP | 0 517 172 A2 | 12/1992 |
| EP | 1 025 424 B2 | 3/2008 |
| EP | 2194020 A2 | 6/2010 |
| JP | 5860224 A | 4/1983 |
| JP | 01114722 U | 5/1989 |
| JP | 04154501 A | 5/1992 |
| JP | 2004325114 A | 11/2004 |
| WO | WO 0188698 A2 | 11/2001 |
| WO | WO 03/009930 A1 | 2/2003 |
| WO | WO 2007093878 A1 | 8/2007 |
| WO | WO 2009/016499 A2 | 2/2009 |
| WO | WO 2009156020 A1 | 12/2009 |

OTHER PUBLICATIONS

German Search Report 10 20 10 031 524.9, dated Jun. 9, 2011.

* cited by examiner

FILLING DEVICE FOR FILLING CONTAINERS

CROSS-REFERENCE TO PRIOR APPLICATIONS

Priority is claimed to German Patent Application No. DE 10 2010 031 524.9, filed on Jul. 19, 2010, the entire disclosure of which is hereby incorporated by reference herein.

FIELD

The present invention relates to a filling device for filling containers with food products in the food industry including at least one weighing device for determining a filling amount.

BACKGROUND

In the food industry, filling processes are often controlled during filling based on the filling amount of a container. For example, the filling of a container can be terminated when a predetermined filling amount is reached. One possibility of determining the filling amount during filling is the use of a weighing means which determines the mass of the container to be filled by means of strain gauges and calculates the filling amount from it.

For this, the strain gauges, which change their electric resistance in case of deformations, are adhered to a component with a special adhesive, the component minimally deforming under load during the filling process. This deformation (extension) then leads to a change of the resistance of the strain gauge from which in turn the mass or the weight of the container to be filled can be calculated. Such filling devices are described in, for example, EP 1 025 424 or DE 10 2008 030 721.

However, it is a disadvantage of such filling devices that the service life of the strain gauges is restricted to a predetermined number of measuring cycles, usually to about 10 million measuring cycles. Using the strain gauges beyond this point can result in material fatigue and thus falsified measuring results, which in turn can result in inaccurate filling amounts.

SUMMARY

In an embodiment, the present invention provides a filling device for filling containers with a food product including at least one weighing device. The at least one weighing device includes at least one piezoelement configured to determine a filling amount of the food product.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
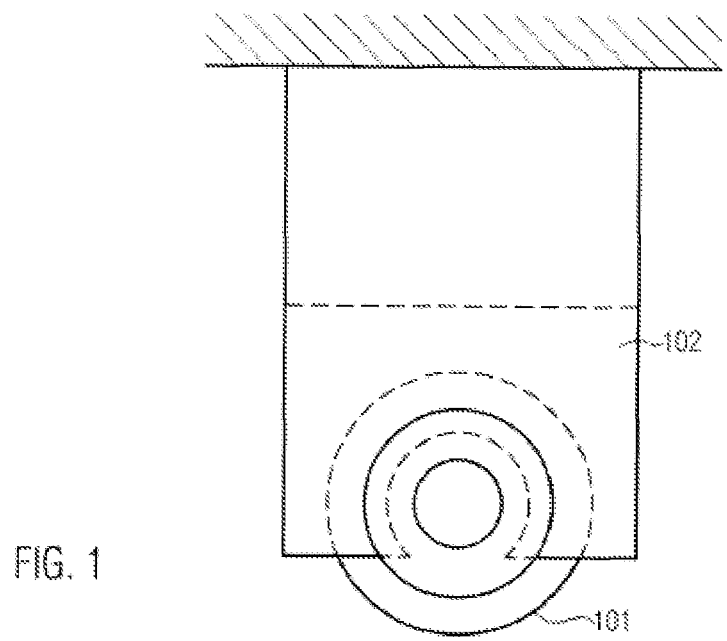
FIG. 1 shows a plan view of a portion of an exemplary filling device.

It is an aspect of the present invention to provide a more reliable filling device for filling containers in the food industry.

In an embodiment, the present invention provides a filling device for filling containers in the food industry including at least one weighing device for determining a filling amount, where the at least one weighing device includes at least one piezoelement.

As piezoelements can be operated essentially without fatigue, by the use of the at least one piezoelement, the reliability of the at least one weighing device and thus the filling device can be increased.

So, the filling device can be a weighing filler, a weighing cell filler or a weight filler, in particular for filling containers with liquid or viscous media, for example beverages, in the food industry.

The filling device can in particular be a filling device for filling containers in the beverage industry.

The filling device can be designed and/or configured such that the at least one weighing device determines a filling amount during a filling operation and controls the filling operation based on the determined filling amount. For example, the filling device can be designed and/or configured such that a filling operation is stopped when a predetermined filling amount is reached.

The containers can be, for example, bottles, in particular plastic bottles and/or glass bottles. Plastic bottles can in particular include polyethylene terephthalate (PET) or consist essentially of PET.

Depending on the design, the filling device can be employed on the one hand for products to be filled aseptically, for example milk or juices, and on the other hand also for products to be filled non-aseptically, for example edible oil, or else for so-called ESL (Extended Shelf Life) products, i.e. filling products which are distributed in a cold chain, for example milk shakes, drinkable yogurt or the like.

The at least one piezoelement can in particular be designed and/or arranged such that the mass, in particular the mass increase, of a container to be filled can be determined with the aid of the at least one piezoelement.

The at least one piezoelement can in particular be a piezoelectric sensor. The at least one piezoelement can in particular include at least one piezoelectric crystal or consist essentially of at least one piezoelectric crystal.

The at least one piezoelement can be arranged such that an increasing mass of a container deforms a piezoelectric crystal of the at least one piezoelement during a filling operation. By the strain or deformation of the piezoelectric crystal, electrical charges are released in the crystal which are directly proportional to the relative deformation of the crystal. These generated electrical charges can be converted to voltage by means of a charge amplifier, and then the measured voltage can be evaluated, for example by a control element, so as to determine a filling amount. Here, the determination can be preferably accomplished continuously or else in steps.

In other words, the at least one weighing device can comprise at least one charge amplifier for converting the charges generated in the at least one piezoelement into voltage. The at least one weighing device can further comprise a control element, in particular for determining the filling amount based on the voltage generated by the charge amplifier.

The at least one piezoelement can comprise silicon dioxide ($SiO_2$). In particular, a piezoelectric crystal of the at least one piezoelement can include silicon dioxide or consist essentially of silicon dioxide. However, any other piezoelectric materials, such as lead-zirconate-titanate (PZT), can be used.

The filling device can further comprise at least one filling element. The at least one filling element can comprise a filling tube and a filling valve, where the filling tube can be particularly but not necessarily arranged at least partially inside a container to be filled, and the introduction of the liquid or viscous medium to be filled into the container can be controlled by the filling valve or its controlling system, respectively.

The filling device can in particular comprise several filling elements, where each of the filling elements comprises a weighing device comprising at least one piezoelement.

The weighing device of each filling element can comprise a separate charge amplifier and/or a separate control element. As an alternative, one charge amplifier and/or control element can be provided for the at least one piezoelement of several filling elements. In other words, the control element can be a central control element.

The filling device can further comprise at least one transport device, where the transport device is designed such that it conveys an empty container to a filling element of the filling device and discharges the filled container from the filling device after the filling operation.

The filling device can be designed such that a container to be filled is mechanically connected with the at least one piezoelement. Thereby, the increasing mass of a container can lead to a deformation of the at least one piezoelement during a filling operation. As discussed above, this deformation can be used again to determine the filling amount.

The at least one piezoelement can in particular be arranged such that it is compressed and/or expanded during the filling operation.

The filling device can be designed such that a container to be filled is connected with the at least one piezoelement via at least one lever. Thereby, the piezoelement can be advantageously held out of the splashing zone of the filling element, in particular for applications with high demands on hygiene, such as ESL-filling or aseptic filling, thereby minimizing or preventing impurities due to product splashes by the filling operation and advantageously meeting required sanitation measures.

The filling device can be configured such that a container to be filled is directly or indirectly connected with the at least one piezoelement.

The filling device can in particular be configured such that a cover element is arranged between a container to be filled and the at least one piezoelement. By the container to be filled then contacting the at least one piezoelement only indirectly, the at least one piezoelement can be protected from damages. As an alternative, the at least one piezoelement can be fastened or fixed by the cover element. Furthermore, the at least one piezoelement can be fastened or fixed at the cover element, and the cover element can be exchangeable. Thereby, the piezoelements of one weighing device can be removed, exchanged and/or re-installed together for maintenance/repair purposes.

The cover element can, for example, include plastics or consist essentially of plastics. For this, PEEK (polyetheretherketone) or PTFE (polytetrafluoroethylene) have proven to be advantageous because these plastics exhibit high resistance to chemicals making the cover element insensitive to cleansing agents and disinfectants employed in bottling plants. For the same reason, stainless steel can also be used for the cover element.

The filling device can further comprise a mounting for retaining a container to be filled, where the at least one piezoelement is arranged in the region of the mounting.

The mounting can in particular be a clamp with at least one clamp arm, the at least one piezoelement being arranged in and/or on the clamp arm. In an embodiment, "on the clamp arm" means that the at least one piezoelement is arranged in a predetermined surface area of the clamp arm.

The mounting can be, for example, a neck handling clamp for retaining a bottle in the region of its neck. Here, the neck handling clamp can comprise at least one clamp arm, where the at least one piezoelement is arranged in and/or on the clamp arm.

The container to be filled can in particular comprise a supporting ring which rests on a predetermined surface area of the mounting, in particular the neck handling clamp. The at least one piezoelement can in this case be arranged in the predetermined surface area of the mounting, in particular the neck handling clamp.

The mounting can be, for example, a base handling element. A base handling element can be defined as a mounting or a receiving element on which a base of a container to be filled will rest during the filling operation. The at least one piezoelement can be arranged in and/or on the receiving element, in particular, the base handling element.

The at least one weighing device can further comprise at least one spring element. By the at least one spring element, a tare, or an empty weight, of the container to be filled can be compensated or taken into consideration. The spring element can be defined as any elastically deformable element or element deformable under pressure in a defined manner which, at each application of a certain pressure, passes over to a predetermined deformed position, and upon termination of the pressure load returns again to the same non-deformed original position, such as flat spiral springs or other types of springs, molded bodies of elastomer, as well as air-pressure supported piston-cylinder elements.

The at least one spring element can in particular be arranged and/or embodied such that a container to be filled is indirectly or directly mechanically connected with the at least one spring element.

In particular, the at least one spring element can be arranged and/or embodied such that a container to be filled deforms the at least one spring element such that the container to be filled comes into mechanical contact with the at least one piezoelement. By adequately selected spring elements, the mass of the empty container can thus be accommodated, whereby the at least one piezoelement is deformed only as a consequence of the increase in the container mass by filling, and thus the filling weight can be directly determined.

Preferably, the spring elements can be exchangeable and/or adjustable, in particular automatically adjustable. Thereby, one can react to different empty container weights, for example with different filling batches. Preferably, all exchangeable spring elements of one weighing device can be exchanged together. Preferably, automatically adjustable spring elements can be automatically adjustable together and simultaneously for all weighing devices of a filling means.

The filling device can further comprise a voltage source which is designed and/or arranged such that a predetermined voltage can be applied to the at least one piezoelement. By this, deformation of the at least one piezoelement can be caused, whereby for example a mounting can be brought into a starting position.

In an embodiment, the present invention provides of using the at least one piezoelement for determining a filling amount in a filling device for filling containers in the food industry.

The at least one piezoelement, the filling device and/or the containers can comprise at least one of the above mentioned features.

In an embodiment, the present invention provides a method of filling containers in the food industry, in particular with liquids, comprising the following steps:

providing a filling device as discussed above;
determining an electrical charge of at least one piezoelement; and
determining a filling amount based on the determined electrical charge.

The at least one piezoelement, the filling device and/or the containers can comprise at least one of the above mentioned features.

In the exemplary FIGS. 1-7, bottles are shown as containers to be filled. However, any other containers employed in the food industry, for example cans or composite carton packages, can be filled with the exemplary filling devices.

In the exemplary FIGS. 1-7, only some parts of the exemplary filling devices are shown for illustration. The exemplary filling devices can in particular comprise several ones of such parts and also further elements.

The exemplary filling devices can be embodied as rotary machines or linear machines and comprise several filling elements. In case of rotary machines, the filling elements can be preferably uniformly distributed at the periphery of a rotor. They can preferably operate continuously. Linear machines can be preferably operated discontinuously. Liquid or viscous media, for example beverages, can be filled in. The temperature of the media to be filled can vary between hot in hot filling, and cold in cold filling.

Figure 2:
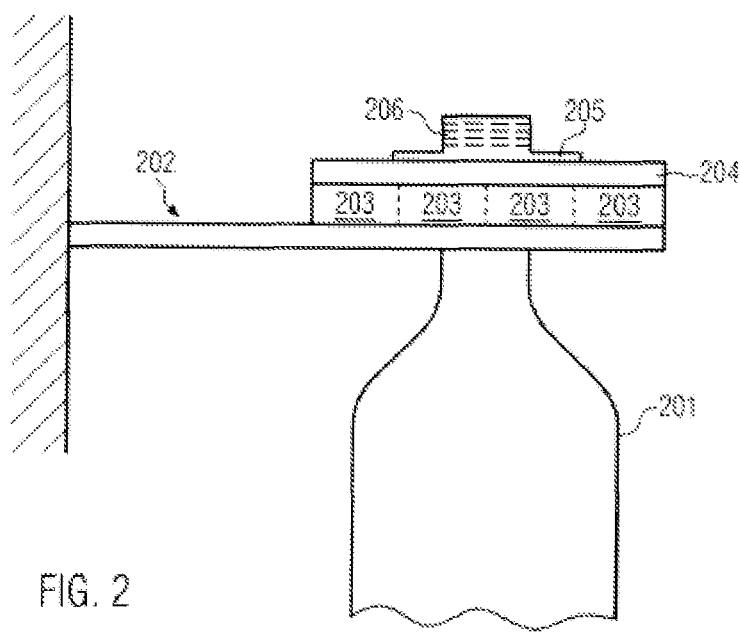
FIG. 2 shows a side view of a portion of an exemplary filling device.

FIGS. 1 and 2 show an exemplary filling device for filling bottles which are retained by a mounting in the region of their necks by so-called neck handling.

FIG. 1 here shows an exemplary bottle 101 which is retained by a neck handling clamp 102. For this, the bottle 101 comprises a supporting ring which rests in a predetermined surface area of the neck handling clamp 102. As an alternative, the neck handling clamp 102 could also comprise at least one clamp arm, preferably at least two clamp arms, which actively or passively clamp the bottle in the region of its neck.

FIG. 2 shows a side view of the arrangement represented in FIG. 1.

The bottle 201 comprises a supporting ring 205 and a thread 206 in the region of the bottle neck for closing the bottle 201 with a screw cap.

In the region of the neck handling clamp 202, in particular on the upper side of the neck handling clamp 202, several piezoelements 203 are arranged. While four piezoelements 203 are shown here, more or less piezoelements 203, or else only one single piezoelement 203, can be used.

The piezoelements 203 are in mechanical contact with the bottle 201 retained by the neck handling clamp 202. In particular, the bottle to be filled 201 is indirectly connected with the piezoelements 203 via a cover element 204. By the cover element 204, the piezoelements 203 can be protected from damages and/or at least partially fixed on the surface of the neck handling clamp 202. As an alternative, the bottle to be filled can be indirectly connected, via a cover element, with the piezoelement or piezoelements by means of a neck handling clamp with at least one clamp arm, preferably with at least two clamp arms.

If the bottle 201 is filled with a liquid or viscous medium, the mass or the weight of the bottle 201 increases corresponding to the filling amount. Thereby, the piezoelements 203 are compressed. By this deformation, an electrical charge is formed in the piezoelement which can be converted into a voltage by a charge amplifier. A central control element neither shown in FIG. 2 can then evaluate this voltage and calculate from this the mass or the filling amount of the product located in the container, taking into consideration the mass of the empty container. As soon as the filling amount desired by the plant operator is reached, a corresponding liquid valve of the filling device can be closed and the filling operation for the container can be terminated. The voltage generated by the crystal deformation can be continuously measured, amplified and evaluated in the process. As an alternative, evaluation can be accomplished at very short time intervals, and the mass increase in the bottle can be thereby determined by several measurements.

For filling the bottle, the filling device can in particular comprise a filling element for free jet filling. In this case, the bottle is usually placed directly under the filling element, where no component of the filling element is arranged within the bottle. As an alternative, it is possible to arrange a filling tube within the bottle by a relative motion of the bottle and the filling element. Due to the properties of the piezoelement, it is irrelevant whether the bottle and/or the filling tube move during the filling operation.

Figure 3:
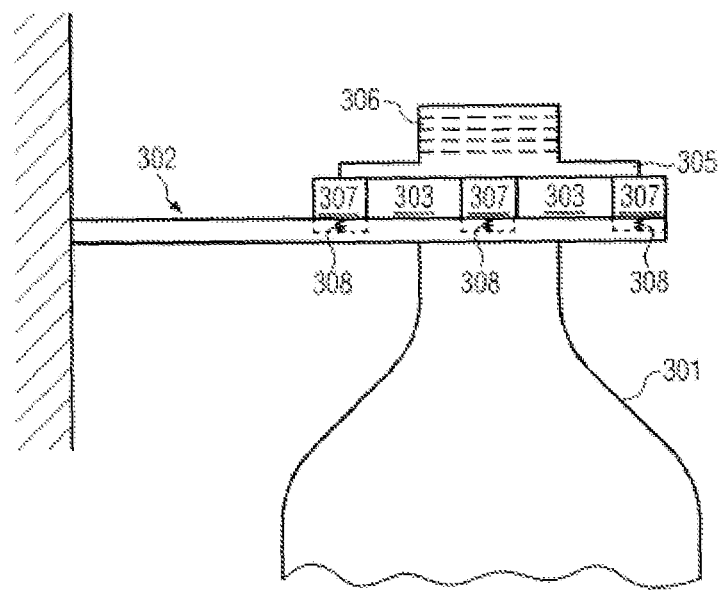
FIG. 3 shows a side view of a portion of another exemplary filling device.

FIG. 3 shows a portion of a further exemplary filling device. Again, a bottle 301 is retained in the region of the bottle neck by a neck holding clamp 302. The bottle again comprises a supporting ring 305 and a thread 306 in the region of the neck.

The filling device, in particular the at least one weighing device of the filling device, in this example comprises two piezoelements 303. Moreover, movably held cylinders 307 are arranged in the region of the piezoelements 303. These cylinders 307 are spring-mounted by spring elements 308, in this embodiment flat spiral springs. By the spring elements 308, the cylinders 307 can be preloaded in a direction parallel to the longitudinal axis of the bottle to be filled 301, in particular such that an empty container to be filled deforms, in particular compresses, the spring elements 308 such that the container to be filled comes into mechanical contact with the piezoelements 303.

In other words, the spring elements 308 are compressed, after the empty bottles have been placed, to such an extent that the cylinders 307 are on the same level with the piezoelements 303. The empty mass of the bottle 301, i.e. the tare, can thus be subtracted. Thereby, the bottle 301 is directly connected to the piezoelements 303 during the weighing operation.

The mass required for further contraction can be calculated by Hooke's law and added to the mass applied at the piezoelements 303.

The diameter of the supporting ring 305 of the bottle 301 can be selected such that the supporting ring 305 comes into contact with at least two cylinders 307.

Figure 4:
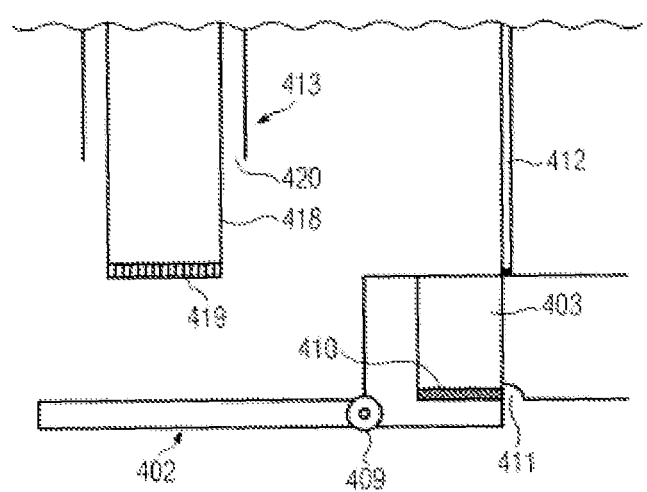
FIG. 4 shows a side view of a portion of another exemplary filling device.

FIG. 4 shows another exemplary filling device. In FIG. 4, the container to be filled is not shown for a better overview. A neck holding clamp 402 is shown again in FIG. 4. The neck holding clamp 402 is movably held at a joint 409. In FIG. 4, a part of a filling element 413, in particular a filling channel 418 with a gas barrier 419 at the end and a CIP (cleaning in place) channel 420 is moreover shown. The bottle is located directly underneath the filling channel 418 during the filling operation. The gas barrier 419 prevents liquid to be filled from flowing out of the filling channel 418 when the shut-off valve arranged at a distance to the gas barrier 419 in the filling channel 418 is closed. The CIP channel 420 and the filling channel 418 can be interconnected in a fluid connection in a known manner by manual or automatic insertion of a CIP cap, thus permitting a cleaning cycle for regular internal cleaning of the filling device.

During the filling operation, the container to be filled becomes heavier due to the increasing filling amount, whereby the end of the neck holding clamp 402 movably held by the joint 409, at which the container is arranged, vertically moves downwards. Thereby, a base 410 arranged at the opposite end of the neck holding clamp 402 moves upwards and thereby compresses the piezoelement 403 which is clamped in a stationary retaining device.

So, in this example, the container to be filled is connected to the piezoelement 403 via a lever formed by the neck holding clamp 402.

To ensure a movement of the neck holding clamp 402 without touching the retaining device provided for the piezoelement 403, a notch 411 can be provided. The retaining device for fastening the piezoelement 403 can be connected to further parts of the filling device by a connecting element 412. In case of rotary machines, the connecting element 412 can in particular be an internal wall of the filling device which holds the piezoelement 403 out of the splashing zone of the filling element and protects it from liquid splashes. In particular, in filling devices for cold-aseptic filling, where hygiene is crucial, it is especially advantageous that as few components as possible are installed within a clean room or an insulator sterile tunnel where cold-aseptic filling is performed. In this case, the connecting element 412 can be the insulator wall which separates the sterile region with the filling element from the non-sterile surrounding area—the filling hall.

A desired tare of the bottle to be filled can be achieved by shortly applying voltage to the piezoelement 403. For this, the filling device can comprise a voltage source which is connected to the piezoelement 403.

By the application of voltage, the piezoelement 403 can be expanded and thereby the contraction already caused by the empty bottle can be compensated.

As an alternative or in addition, an already known value of the mass of the bottles in the empty state can be determined and stored in a control element in which it is then subtracted later from the value measured by the piezoelement 403. By this, the net filling weight of the bottle can be determined.

Figure 5:
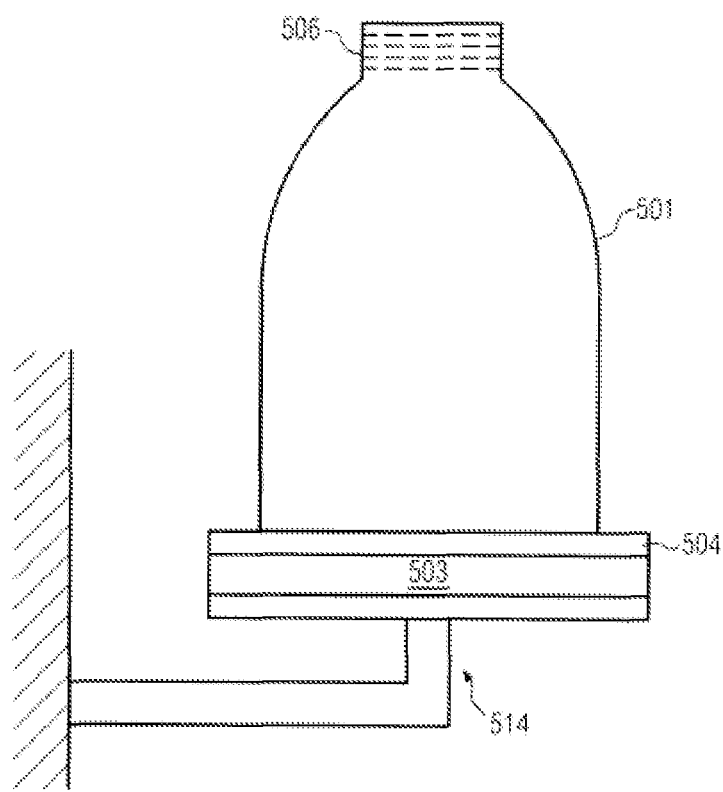
FIG. 5 shows a side view of a portion of another exemplary filling device.

FIG. 5 shows a portion of another exemplary filling device, in particular for filling glass bottles. In this case, the exemplary filling device comprises a mounting in the form of a receiving element 514. The receiving element 514 is here embodied as a base handling element. In other words, the bottle to be filled 501 is arranged on the receiving element 514 during the filling operation. Here, the receiving element 514 can alternatively be movable vertically by a drive means. This is in particular advantageous when a filling element is used which comprises a filling tube. In this manner, for example highly foaming products can be filled in a bottom layer.

The receiving element 514 further comprises a piezoelement 503. A cover element 504 is arranged between the bottle to be filled 501 and the piezoelement 503 for protecting the piezoelement 503. As an alternative, several piezoelements can be arranged at the receiving element 514.

Figure 6:
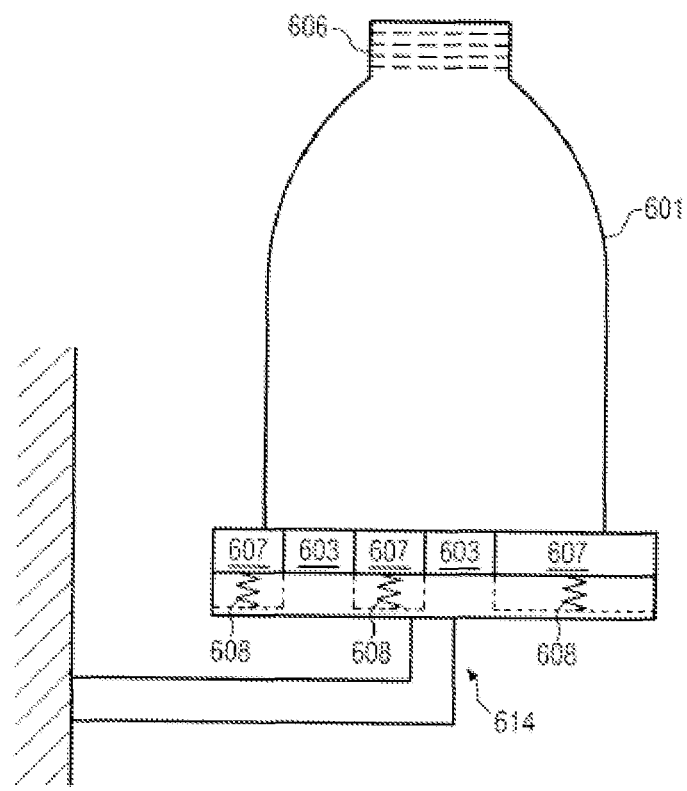
FIG. 6 shows a side view of a portion of another exemplary filling device.

FIG. 6 shows a portion of a further exemplary filling device. In particular, FIG. 6 shows a mounting in the form of a receiving element 614. As in FIG. 5, the receiving element 614 is a base handling element on which a bottle to be filled 601 is arranged during the filling operation. The exemplary bottle 601 can comprise, for example, a thread 606 for closing the bottle 601 with a screw cap.

The receiving element 614 comprises two piezoelements 603 as well as three cylinders 607 which are each spring-mounted by spring elements 608, in this embodiment flat spiral springs. By this, the empty weight of the bottle to be filled 601 can be taken into consideration as is illustrated in connection with FIG. 3. As an alternative to the described base handling embodiments (FIG. 5, FIG. 6), it is furthermore possible, and even advantageous for filling involving high demands on hygiene, to provide, between the installation position of the piezoelement/s and the container bottom, a mechanical partition between a for example sterile region above the mechanical partition and a non-sterile region underneath the partition, where the installation position of the piezoelement is located in the non-sterile region. A preferably frictionless sliding passage of the receiving element through the mechanical partition can then be preferably sealed, for example by a bellow, so that no medium exchange between the two separated regions is possible.

Figure 7:
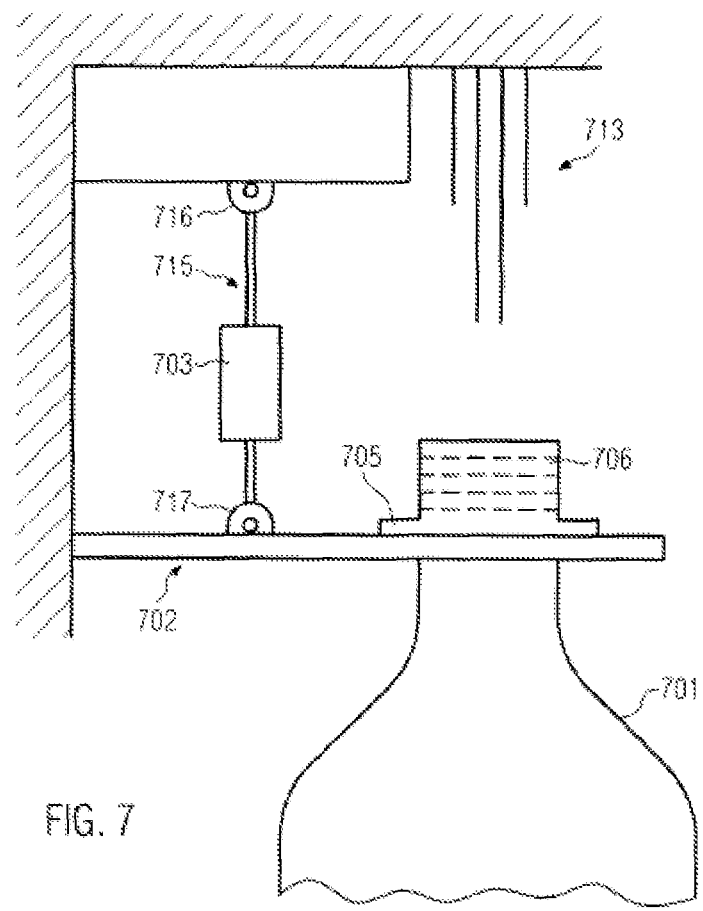
FIG. 7 shows a side view of a portion of another exemplary filling device.

FIG. 7 shows a portion of a further exemplary filling device. In particular, FIG. 7 shows an exemplary bottle 701, in particular a PET bottle, comprising a supporting ring 705 and a thread 706. With the supporting ring 705, the bottle to be filled rests on a predetermined surface area of a neck handling clamp 702. The bottle 701 can be filled via a filling element 713 of the filling device.

The neck holding clamp 702 is in this example connected with a pulling element 715. In particular, the pulling element 715 is connected at a first fixing point 716 with a portion of the filling device located thereabove, and at a second fixing point 717 with the neck holding clamp 702. The pulling element 715 is moreover connected to a piezoelement 703.

During the filling operation, the neck holding clamp 702 moves downward in the vertical direction. By this, the piezoelement 703 is extended. The electrical charge arising in the process can be again evaluated by a control element.

The above described use of a piezoelement additionally offers some other advantages over strain gauges.

For example, piezoelements can be embodied to be essentially smaller than a measuring device with strain gauges. In bottling plants, saving space is an important factor, in particular in view of the possibilities of installing further technical features for the bottling plant obtained by the additional space.

With the same measuring range and similar performance properties, a piezoelectric transducer can be embodied to be smaller by a factor 30 than a comparable strain gauge.

In the food industry, in particular in the beverage industry, very high filling rates are achieved, usually up to several thousand containers per hour. By filling several thousand containers per hour, the containers to be filled can be quickly and thus dynamically changed at each weighing device. Due to their high natural frequency, piezoelements are particularly suited for such dynamic applications.

Moreover, the measuring path in piezoelectric sensors can be minimized as the piezoelectric crystal already forms the mechatronical component with an electric output signal. The measuring sensitivity of a piezoelectric sensor usually does not depend on its size or the volume of the piezoelectric crystal, but only on the material used and its geometry.

Piezoelectric sensors can also be used in high temperature ranges which can occur, for example, during hot filling of beverages.

Piezoelectric sensors typically work free from overloading and have a large measuring range which also permits an exact filling of containers. In case of a faulty overfilling of a container, due to the overload protection and the large measuring range, a damage of the weighing device can be prevented. A piezoelectric crystal operates stably and essentially in a fatigue-proof manner for a long time. By this, cost-intensive maintenance woks can be minimized.

As a summary, the advantageous properties of piezoelectric crystals can be summarized as follows:
high insulation resistance,
high mechanical strength,
high modulus of elasticity,
no gyro-electricity (depending on the type of crystal),
no hysteresis,
very high linearity,
perfect stability.

It will be understood that features mentioned in the above described embodiments are not restricted to these special combinations and are also possible in any other combinations. Further, the present invention is not limited to the embodiments described herein; reference should be had to the appended claims.

What is claimed is:

1. A filling device for filling containers with a food product comprising:
at least one weighing device including at least one piezoelement configured to determine a filling amount of the food product,
wherein the piezoelement is configured to mechanically connect with a container to be filled.

2. The filling device according to claim 1, wherein the piezoelement is disposed on the filling device so as to be at least one of compressed and expanded during a filling operation.

3. The filling device according to claim 1, further comprising a lever configured to connect the piezoelement with a container to be filled.

4. The filling device according to claim 1, further comprising a cover element disposed between the at least one piezoelement and a container to be filled.

5. The filling device according to claim 1, further comprising a mounting configured to retain a container to be filled, wherein the at least one piezoelement is disposed in a region of the mounting.

6. The filling device according to claim 1, wherein the at least one weighing device includes at least one spring element.

7. The filling device according to claim 6, wherein the at least one spring element is configured to be deformed by a container to be filled such that the container to be filled comes into mechanical contact with the at least one piezoelement.

8. A method of filling containers with a food product comprising:
providing the containers to a filling device having at least one weighing device including at least one piezoelement configured to determine a filling amount of the food product;
determining an electrical charge of the at least one piezoelement; and
determining a filling amount based on the determined electrical charge.

9. The method according to claim 8, wherein the food product is a liquid food product.

10. The method according to claim 8, further comprising providing a voltage source configured to provide a predetermined voltage to the at least one piezoelement.

11. The method according to claim 10, wherein the predetermined voltage is provided to the at least one piezoelement based on a weight of a respective unfilled one of the containers.

12. The filling device according to claim 1, further comprising a voltage source configured to provide a predetermined voltage to the at least one piezoelement.

13. A filling device for filling containers with a food product comprising:
at least one weighing device including at least one piezoelement configured to determine a filling amount of the food product,
wherein the piezoelement is disposed on the filling device so as to be at least one of compressed and expanded during a filling operation.

14. The filling device according to claim 12, wherein the voltage source is configured to deform the at least one piezoelement back to a starting position after a respective unfilled one of the containers has been provided to the filling device.

15. The filling device according to claim 13, wherein the predetermined voltage is present at the at least one piezoelement and corresponds to a weight of a respective unfilled one of the containers.

* * * * *